Dec. 16, 1958  F. G. PRESNELL  2,864,402
MOTOR CONTROL VALVE WITH AUTOMATIC HOLD AND RELEASE
Original Filed July 14, 1952  2 Sheets-Sheet 1
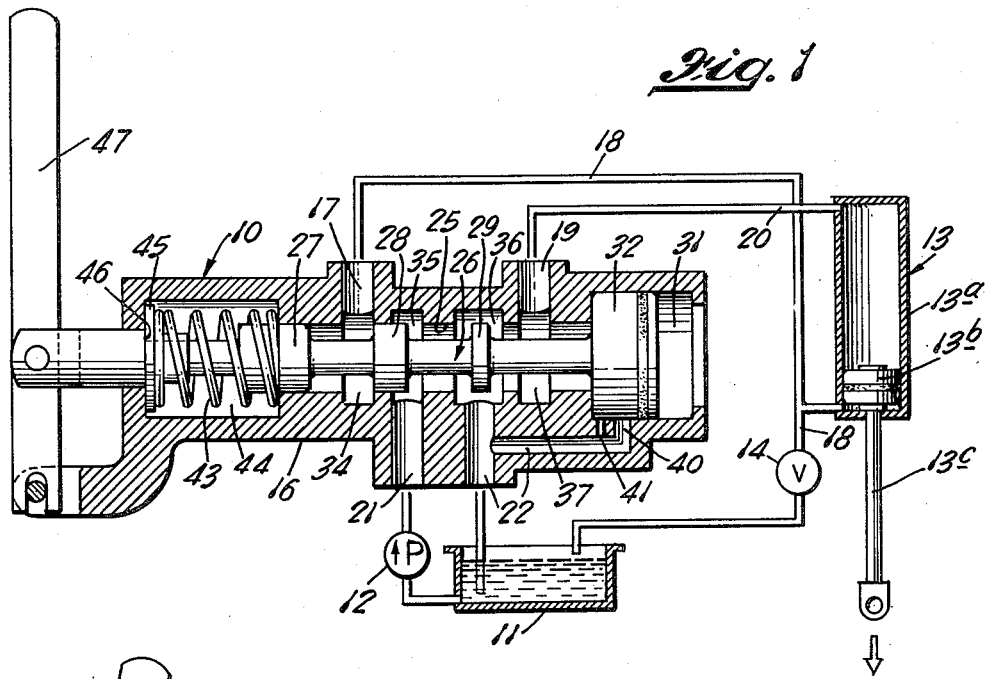
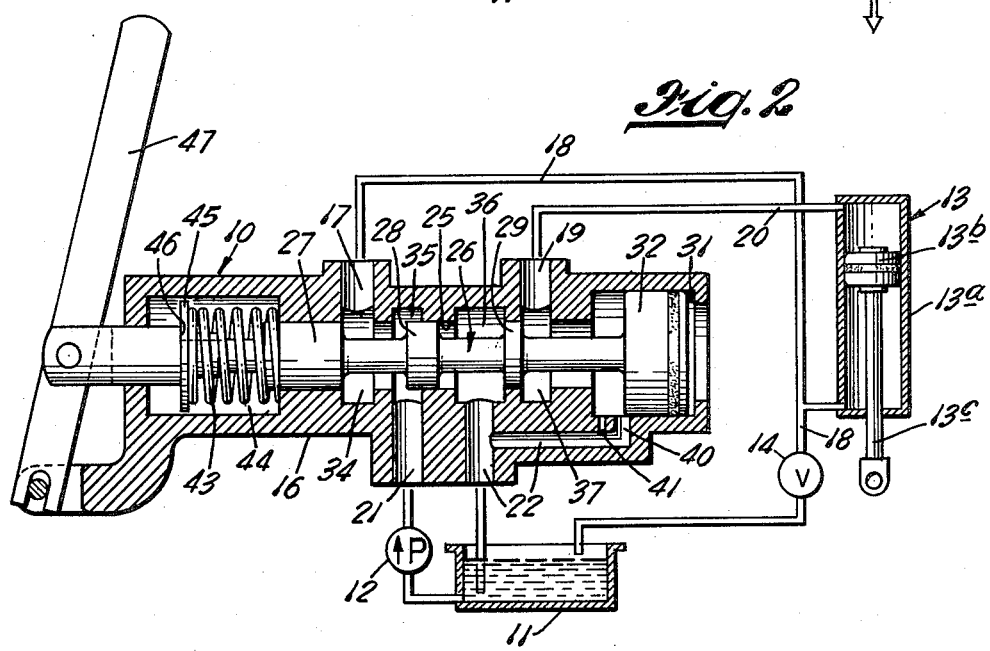
INVENTOR.
FRANK G. PRESNELL
BY
ATTORNEY

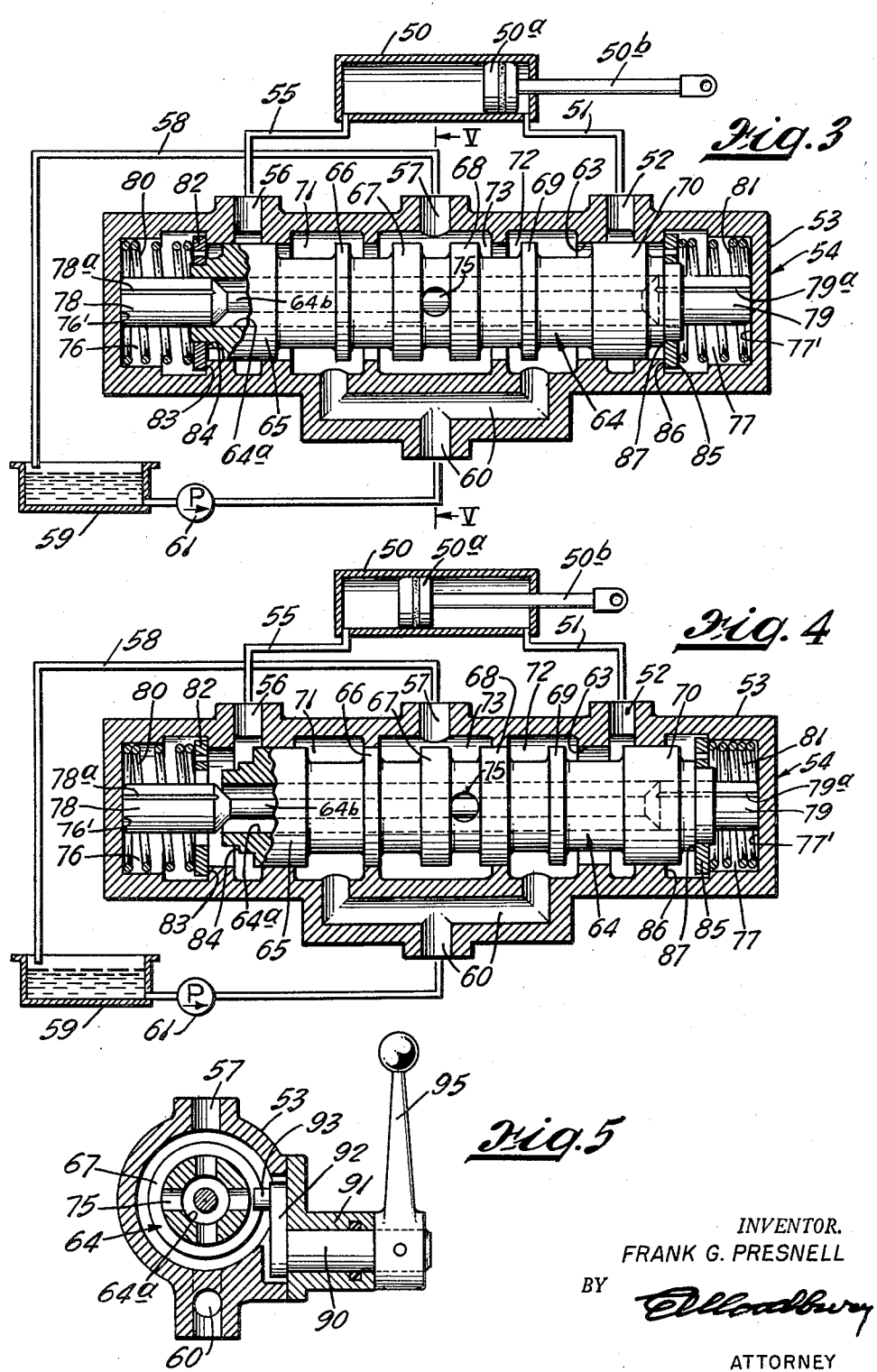

United States Patent Office

2,864,402
Patented Dec. 16, 1958

2,864,402

MOTOR CONTROL VALVE WITH AUTOMATIC HOLD AND RELEASE

Frank G. Presnell, Los Angeles, Calif., assignor to Bendix Aviation Corporation, South Bend, Ind., a corporation of Delaware Continuation of abandoned application Serial No. 298,857, July 14, 1952. This application January 6, 1956, Serial No. 557,779

10 Claims. (Cl. 137—622.5)

This application is a continuation of my similarly entitled copending application Serial No. 298,857, filed July 14, 1952, and now abandoned.

The present invention relates to self-holding selector valves of the type which is constantly urged toward a neutral position by a centering spring, but that which after being manually shifted out of neutral position to deliver fluid to a motor cylinder is held shifted by the fluid flow and does not restore to neutral position until the motor completes its stroke and stops the flow.

An object of the invention is to provide a self-holding valve of the flow-responsive type that is relatively simple, reliable and inexpensive to produce.

Another object is to provide a flow-actuated self-holding valve that automatically impedes the flow only to the extent necessary to overcome the restoring force.

Other more specific objects and features of the invention will appear from the description to follow.

Heretofore, flow-responsive self-holding valves have utilized relief valves in the flow path of the line fluid to produce a pressure drop across the valve piston or spool to overcome the force of the centering spring. In such valves the relief valve spring should be carefully matched to the centering spring. If it is too weak the valve will not be positively held open during flow. If too strong, the pressure drop is excessive and power is wasted.

The present invention solves this problem by making the valve piston itself serve as a relief valve. This eliminates the expense of a separate relief valve and automatically provides just sufficient pressure drop to overcome the centering spring.

In the drawing:

Figure 1 is a schematic diagram showing a two-position valve incorporating the invention, the valve being shown in neutral position;

Figure 2 is a diagram similar to Figure 1 but showing the valve in an actuated position;

Figure 3 is a schematic diagram showing a three-position valve incorporating the invention, the valve being shown in neutral position;

Figure 4 is a diagram similar to Figure 3 but showing the valve in an actuated position; and Figure 5 is a detail cross section taken in the plane V—V of Figure 3.

Referring first to Figure 1, there is shown a system comprising a valve 10 in accordance with the invention, a reservoir 11 for hydraulic fluid, a pump 12 for delivering pressure fluid from the reservoir 11 to the valve 10, a motor 13, and a manual valve 14.

The valve 10 comprises a body 16 having a motor passage 17 connected to a motor line 18 leading to the motor 13, a motor passage 19 connected by a motor line 20 to the motor 13, a pressure passage 21 connected to the output of the pump 12, and a return passage 22 connected to the reservoir 11.

The motor 13 is shown as comprising a cylinder 13a containing a piston 13b which is connected by a piston rod 13c to a load not shown. It is to be understood that the load is constantly applied to the piston rod 13c to exert a downward force thereon which lowers the piston 13b whenever pressure fluid is released from the lower end of the cylinder 13a. This lowering may be accomplished by opening the valve 14 which releases fluid from the motor line 18 directly to the reservoir 11. The valve 10 is used only to admit pressure fluid to the motor line 18 to raise the piston 13b.

The valve body 16 defines a cylindrical valve bore 25 containing a movable valve member 26, shown as a spool valve, having a plurality of lands 27, 28 and 29 thereon which are fitted to the cylindrical valve bore 25. At the right end of the body 16 there is provided a cylindrical chamber 31 of larger diameter than the valve bore 25 and containing a piston 32 which is attached to the right end of the movable valve member 26. The cylindrical valve bore 25 is provided with a plurality of annular recesses 34, 35, 36 and 37 which are connected to the motor passage 17, the pressure passage 21, the return passage 22, and the motor passage 19, respectively. The chamber 31 is connected by a passage 40 to the return passage 22. A restricted bleed passage 41 also connects the chamber 31 to the return passage 22 at a point to the left of the passage 40.

The movable valve member 26 is normally maintained in leftmost (neutral) position as shown in Figure 1 by a restoring spring 43 which is positioned in a spring chamber 44 in the valve body 16 and is compressed between the right end of the spring chamber and a washer 45 which rests against a flange 46 on the piston 26. The left end of the member 26 extends exteriorly of the body 16 and is connected to an actuating lever or handle 47.

The operation of the system described will now be explained. Referring first to Figure 1, when the valve 10 is in its neutral position as shown, motor passage 17 is blocked by the piston lands 27 and 28, but the pressure passage 21, the return passage 36 and the motor passage 19 are interconnected, so that fluid from the pump 12 is circulated directly back to the reservoir 11 without developing any pressure.

Now assume that the handle 47 is swung to the right to shift the valve into an actuated position as shown in Figure 2. In this position the piston land 28 has moved to the right to block communication between the pressure passage 21 and the return passage 22, but has connected the pressure passage 21 to the motor passage 17. The output of the pump therefore flows through the motor line 18 to the lower end of the motor cylinder 13a, raising the piston 13b therein against the force of the load connected to the piston rod 13c. The upward movement of the motor piston 13b displaces fluid out of the upper end of the cylinder 13a through the motor line 20 into the motor passage 19 of the valve 10 and thence into the left end of the chamber 31, return flow from the passage 19 direct to the return passage 22 being blocked by the land 29 of the valve piston. The path for return flow is therefore through the chamber 31 and out through the passage 40 into the return passage 22 and back to the reservoir 11.

As soon as the operator swings the handle 47 into the right position as shown in Figure 2, he releases it, and the valve maintains itself in this position as long as flow continues through the motor line 20 and chamber 31 and the port 40 to return, because the pressure in the left end of the chamber 31 will be automatically maintained sufficient to hold the movable member 26 in its actuated position against the restoring force of spring 43. This is because any leftward movement of the piston 32 tends to close the passage 40 and throttle the flow of the return fluid, thereby raising its pressure sufficient to prevent more than a very limited movement to the left of the piston 32. In other words, the passage 40 and piston 32 constitute a means responsive to movement of the member 26 for making a connection between chamber 31 and the return passage 22 during the actuated position of member 26 and breaking the connection in response to movement of the member 26 out of an actuated position, whereby the flow from the motor passage 19 to the return passage 22 is automatically impeded to the minimum extent necessary to just maintain the member 26 in its actuated position against the force of the restoring spring 43.

The valve will therefore remain in the position shown in Figure 2 until the motor piston 13b has reached the upper end of its stroke and is forced to stop. This immediately stops flow of return fluid through the motor line 20 and into the left end of the chamber 31. The fluid remaining in the left end of chamber 31 is first dissipated through the bleed passage 41 until the latter is covered by the piston 32 in its leftward movement. Before the bleed passage 41 is covered by the piston 32, the land 29 moves into the return recess 36, thereby permitting free flow of any pressure fluid in the left end of the chamber 31 directly to the return passage 22. Restoration of the movable member 26 to neutral position restores the free path for flow of pressure fluid from the pressure passage 21 past the land 28 direct to the return passage 22 thereby unloading the pump.

When it is desired to lower the motor piston 13b this can be done under control by opening the valve 14 to the desired extent, it being understood that the load on the piston rod 13c is always sufficient to move the piston 13b downwardly whenever the fluid pressure therebelow is released.

Figures 3 and 4 show a different design of valve incorporating the invention which is simpler in some respects than the valve in Figures 1 and 2. This design is shown in a 4-way valve adapted for two way power operation of a motor, or in other words, a valve that has a central neutral position and two active end positions.

Referring to Figure 3, the hydraulic circuit therein disclosed comprises a two way or double acting motor cylinder 50 containing a piston 50a adapted to be connected by a piston rod 50b to a load. The right end of the motor 50 is connected by a motor line 51 to one motor passage 52 of a valve body 53 of a valve 54 in accordance with the invention. The left end of the motor cylinder 50 is connected by a motor line 55 with another motor passage 56 in the valve body 53. The valve body 53 is also provided with a return passage 57 connected by a return line 58 to a reservoir 59, and a pressure passage 60 which is connected to the output of a pump 61, the inlet of which is connected to the reservoir 59.

The valve body 53 defines a cylindrical valve bore or chamber containing a movable member 64 which has lands 65, 66, 67, 68, 69 and 70 sealing with the cylindrical valve bore. The valve bore has annular recesses defining pressure chambers 71 and 72 spaced apart and connected to the pressure passage 60. Intermediate the pressure chambers 71 and 72 is a return chamber 73 which is connected to the return passage 57.

The movable member 64 is hollow, defining a longitudinal cylindrical passageway or passage 64a which is open at its opposite ends and which is connected permanently by a lateral passage 75 to the return chamber 73.

The opposite ends of the cylindrical valve bore communicate with chambers 76 and 77 which contain stub plungers 78 and 79 which extend inwardly from the opposite ends of the valve body into fitting relation with the outer end portions of the passage 64a.

It will be noted that the outer ends of stop plungers 78 and 79 abut the inner end wall 76' and 77', respectively, of the chambers 76 and 77 respectively, and are connected by a rod member 64b interposed between said plunger member and extending through the longitudinal passage 64a, said rod member retaining the plunger members in a fixed abutting relationship with respect to the aforementioned end walls of the chambers, and stationary with respect to the movable member 64.

The plunger members 78 and 79 include in their outer peripheries, longitudinally extending bleed passages 78a and 79a, respectively, the function of which will be subsequently described.

The movable valve member 64 is normally maintained in the center position shown in Figure 3 by a pair of centering springs 80 and 81 located in the chambers 76 and 77 respectively. The spring 80 is compressed between the inner end wall 76' of the chamber 76 and a washer 82 which is adapted to bear both against a shoulder 83 in the valve body and a shoulder 84 on the movable member 64. The spring 81 is compressed between the inner end wall 77' of the chamber 77 and a washer 85 which is adapted to bear both against a shoulder 86 in the valve body and a shoulder 87 on the movable member 64.

Various mechanisms may be employed for manually shifting the movable member 64 from its neutral position into either end position. One such structure is shown in Figure 5. It comprises a shaft 90 journalled in a suitable bearing member 91 attached to the valve body 53 and having on its inner end an arm 92 having a pin 93 which projects into the groove defined between the lands 67 and 68 respectively. There is mounted on the outer end of the shaft 90 a handle 95.

The valve of Figures 3 and 4 functions as follows:

In neutral position, as shown in Figure 3, both of the motor passages 56 and 52 are blocked by the lands 65 and 70 respectively and both pressure chambers 71 and 72 are connected to the return chamber 73 so that the pump 61 does not develop any pressure.

Now let it be assumed that by means of the handle 95 the movable member 64 is initially shifted out of neutral position into the rightmost position shown in Figure 4. In this position, the land 66 blocks flow of pressure fluid from the pressure chamber 71 to the return chamber 73, and the land 68 blocks flow of pressure fluid from the pressure chamber 72 to the return chamber 73. Therefore the pump 61 builds up pressure in the pressure passage 60 and since the rightward movement of the land 70 has uncovered the motor passage 52, the pressure fluid flows through the motor line 51 into the right end of the motor cylinder 50 moving the motor piston 50a to the left.

The leftward movement of the motor piston displaces fluid from the left end of the motor cylinder 50 through the motor line 55 and into the motor passage 56 of the valve 54. Since in the right actuated position of the movable member 64 the land 65 uncovers the motor passage 56, the return fluid flows into the left chamber 76 of the valve. Furthermore, since the plunger 78 is of such length that it clears the cylinder 64a in the movable member, fluid exhausts freely through the passage 64a and the lateral passage 75 into the return chamber 73 and thence back to the reservoir 59.

The pressure drop between the chamber 76 and the cylindrical passage 64a is sufficient to maintain a pressure force on the left end of the movable member 64 sufficient to hold it in the right actuated position against the force of the restoring spring 81. If the movable member returns to the left, it additionally throttles the flow of fluid into the left end of the passage 64a and thereby raises the pressure in the chamber 76 sufficient to definitely limit the return movement of the movable member toward the position where the plunger 78 begins to lap the passage 64a.

When the motor piston 50a reaches the left end of its stroke and stops, return flow through the motor line 55 ceases and what fluid remains in the chamber 76 is dissipated through a bleed groove 78a in the surface of the plunger 78, thereby permitting the restoring spring 81 to shift the movable member 64 back into the neutral position of Figure 3.

When the motor piston 50a is to be moved into its right end position, the movable member 64 of the valve is moved into its left actuated position by manipulation of the handle 95. Since the valve is perfectly symmetrical, this reverses the pressure conditions as compared to those that obtain in the rightmost position (described) of the movable member 64. In this instance, however, the movable member 64 is moved to the left against the restoring force of the spring 80, and the plunger 79 in the right end of the valve body functions as a throttling member to maintain fluid pressure in the spring chamber 77 sufficient to hold the valve in leftmost position until the motor piston 50a has completed its stroke.

Although for the purpose of explaining the invention, a particular embodiment thereof has been shown and described, obvious modifications will occur to a person skilled in the art, and I do not desire to be limited to the exact details shown and described.

I claim:

1. A hydraulic control valve comprising: a body member having a longitudinally extending valve chamber with a movable member therein forming a slide valve therewith, said movable member having a longitudinally extending passageway therein for conducting fluid out of one end of said valve chamber; a longitudinally extending plunger member in said end of said valve chamber adapted to project into said passageway of said movable member, said movable member being slidable longitudinally of said chamber between a first position wherein it is telescoped over said plunger member restricting flow into said passageway, and a second position adjacent the end of said plunger member wherein it throttles flow between the adjacent end surfaces of said plunger and movable members as the flow proceeds out of said end of said valve chamber, said body member having passage means therein for conducting fluid under pressure to said end of said valve chamber; and means biasing said movable member toward said end of said valve chamber; whereby said biasing means is prevented from moving said movable member from its throttling position to its passageway restricting position as a result of back-pressure produced by the throttling action of the flow out of said end portion of said chamber.

2. A hydraulic control valve comprising: a body member having a longitudinally extending valve chamber with a movable member therein forming a slide valve therewith, said movable member having a longitudinally extending passageway therein for conducting fluid out of one end of said valve chamber; a longitudinally extending plunger member in said end of said valve chamber adapted to project into said passageway of said movable member, said movable member being slidable longitudinally of said chamber between a passageway restricting position wherein it is telescoped over said plunger member and a throttling position adjacent the end of said plunger member wherein it throttles flow between the end of said plunger member and the adjacent end of said movable member, said body member having passage means therein for conducting fluid under pressure to said end of said valve chamber; and means biasing said movable member toward said end of said valve chamber; whereby said biasing means is prevented from moving said movable member from its throttling position to its passageway restricting position as a result of back-pressure produced by the throttling action between said plunger and the end of said movable member as the flow proceeds out of said end portion of said chamber, and whereby the movable member continues to telescope over said plunger member after it closes off said longitudinally extending passageway to permit the completion of other slide valve operations.

3. A hydraulic control valve comprising: a body member having a longitudinally extending valve chamber with a movable member therein forming a slide valve therewith, said movable member having a longitudinally extending passageway therein for conducting fluid out of one end of said valve chamber; a longitudinally extending plunger member in said end of said valve chamber adapted to project into said passageway of said movable member; said movable member being slidable longitudinally of said chamber between a first position adjacent said end of said chamber wherein it is telescoped over said plunger member substantially closing off said passageway and a second position removed from said end of said valve chamber wherein flow out of said end of said valve chamber is throttled between adjacent ends of said plunger and movable members; said body member having pressure inlet porting to said end of said valve chamber which porting is closed off by said movable member when in its first position, and which porting communicates with said end portion of said valve chamber when said movable member is moved out of its first position toward its second position; and means biasing said movable member from its second position toward its first position; whereby pressure built-up in said end portion of said chamber as a result of said throttling action prevents said biasing means from moving said movable member into its first position until such time as flow to said valve is stopped and said plunger member closes off said longitudinally extending passageway, and after which time said biasing means continues to move said movable member into its first position closing off said porting to prevent further flow through said valve.

4. A hydraulic control valve comprising: a body member having a longitudinally extending valve chamber with a movable member therein forming a slide valve therewith, said movable member having a longitudinally extending passageway therein for conducting fluid out of one end of said valve chamber; a longitudinally extending plunger member in said end of said valve chamber adapted to project into said passageway of said movable member, said movable member being slidable longitudinally of said chamber from a first position wherein flow out of said end of said chamber into said longitudinally extending passageway is throttled between adjacent ends of said plunger and movable members, through a second position wherein said plunger member just enters the end of said longitudinally extending passageway to substantially cut-off flow through said passageway, to a third position wherein said movable member is further telescoped over said plunger member; said body member having pressure inlet porting to said end of said valve chamber which porting is closed off by said movable member when in its third position, and which porting communicates with said end portion of said valve chamber when said movable member is in its second position; means biasing said movable member from its first position to its third position; and passage means providing restricted flow communication between said end portion of said chamber and said passageway to permit fluid to escape from said end of said valve chamber as said movable member moves from said second to said third position; whereby pressure built-up in said end portion of said chamber as a result of said throttling action prevents said biasing means from moving said movable member into its second position until such time as flow to said valve is stopped, and after which time said biasing means moves said movable member from its second position into its third position closing off said porting to prevent further flow through said valve.

5. A hydraulic control valve comprising: a body member having a longitudinally extending valve chamber with a movable member therein forming a slide valve therewith, said movable member having a longitudinally extending passageway therein for conducting fluid out of one end of said valve chamber; a longitudinally extending plunger member in said end of said valve chamber adapted to project into said passageway of said movable member; said movable member being slidable longitudinally of said chamber between a first position wherein flow out of said end of said chamber into said longitudinally extending passageway is throttled between adjacent ends of said plunger and movable members through a second position wherein said plunger member just enters the end of said longitudinally extending passageway to substantially cut-off said passageway, to a third position wherein said movable member is further telescoped over said plunger member; said body member having pressure inlet porting to said end of said valve chamber which porting is closed off by said movable member when in its third position, and which porting communicates with said end portion of said valve chamber when said movable member is in its second position; means biasing said movable member from its first position to its third position; and a longitudinally extending groove in the surface of said plunger member providing restricted flow communication between said end portion of said chamber and said passageway; whereby pressure built-up in said end portion of said chamber as a result of said throttling action prevents said biasing means from moving said movable member into its second position until such time as flow to said valve is stopped, and after which time said biasing means moves said movable member from its second position into its third position closing off said porting to prevent further flow through said valve.

6. A hydraulic control valve comprising: a body member having a longitudinally extending valve chamber with a movable valve member therein forming a slide valve therewith; said valve chamber having first and second chamber portions at opposite ends of said movable member, and said movable member being slidable from an intermediate position to a first position wherein it projects into said first chamber portion, and from said intermediate position to a second position wherein it projects into said second chamber portion; means for conducting a pressure fluid into one of said first and second chamber portions while preventing said pressure fluid from entering the other of said first and second chamber portions; said movable member having a longitudinally extending bore between opposite ends of said member for conducting fluid flow out of said chamber portions; first and second stationary plugs in said first and second chamber portions respectively each extending into its adjacent end of said bore when said movable member is in its intermediate position; said first plug cooperating with its end of said movable member to throttle flow into said bore from said first chamber portion when said movable member is in its second position, and said second plug cooperating with its end of said movable member to throttle flow into said bore from said second chamber portion when said movable member is in its first position; and spring means biasing said movable member from its first and second positions toward said intermediate position; whereby said movable member is prevented from being moved by said spring means from said first and second positions to said intermediate position by the back pressure built up in said chamber portions as a result of the throttling action above described.

7. A hydraulic control valve comprising: a body member having a longitudinally extending valve chamber with a movable valve member therein forming a slide valve therewith; said valve chamber having first and second chamber portions at opposite ends of said movable member, and said movable member being slidable from an intermediate position to a first position wherein it projects into said first chamber portion, and from said intermediate position to a second position wherein it projects into said second chamber portion; normally closed fluid inlet porting to said first chamber portion which is opened by said movable member when moved out of its intermediate position toward its second position; normally closed fluid inlet porting to said second chamber portion which is opened by said movable member when moved out of its intermediate position toward its first position; said movable member having a longitudinally extending bore between opposite ends of said member for conducting fluid flow out of said chamber portions; first and second stationary plugs in said first and second chamber portions respectively each extending into its adjacent end of said bore when said movable member is in its intermediate position; said first plug cooperating with its end of said movable member to throttle flow into said bore from said first chamber portion when said movable member is in its second position, and said second plug cooperating with its end of said movable member to throttle flow into said bore from said second chamber portion when said movable member is in its first position; and spring means biasing said movable member from its first and second positions toward said intermediate position; whereby said movable member is prevented from being moved by said spring means from said first and second positions to said intermediate position by back pressure built up in said chamber portions as a result of the throttling action above described until such time as flow to said chamber portions is stopped, whereupon said spring means moves said movable member to its intermediate position preventing further flow through said valve.

8. A hydraulic control valve comprising: a body member having a longitudinally extending valve chamber with a movable valve member therein forming a slide valve therewith; said valve chamber having first and second chamber portions at opposite ends of said movable member, and said movable member being slidable from an intermediate position to a first position wherein it projects into said first chamber portion, and from said intermediate position to a second position wherein it projects into said second chamber portion; normally closed fluid inlet porting to said first chamber portion which is opened by said movable member when moved out of its intermediate position toward its second position; normally closed fluid inlet porting to said second chamber portion which is opened by said movable member when moved out of its intermediate position toward its first position; said movable member having a longitudinally extending bore between opposite ends of said member for conducting fluid flow out of said chamber portions; first and second stationary plugs in said first and second chamber portions respectively each extending into its adjacent end of said bore when said movable member is in its intermediate position; said first plug cooperating with its end of said movable member to throttle flow into said bore from said first chamber portion when said movable member is in its second position, and said second plug cooperating with its end of said movable member to throttle flow into said bore from said second chamber portion when said movable member is in its first position; each of said plugs having a flow restricting passageway therein providing restricted flow communication between its cooperating end chamber portion and said longitudinally extending bore of said movable member; and spring means biasing said movable member from its first and second positions toward said intermediate position; whereby said movable member is prevented from being moved by said spring means from said first and second positions to said intermediate position by back pressure built up in said chamber portions as a result of the throttling action above described until such time as flow to said chamber portions is stopped, whereupon said spring means moves said movable member to its intermediate position preventing further flow through said valve.

9. A hydraulic control valve comprising: a body member having a longitudinally extending valve chamber with a movable valve member therein forming a slide valve therewith; said valve chamber having first and second chamber portions at opposite ends of said movable member, and said movable member being slidable from an intermediate position to a first position wherein it projects into said first chamber portion, and from said intermediate position to a second position wherein it projects into said second chamber portion; normally closed fluid inlet porting to said first chamber portion which is opened by said movable member when moved out of its intermediate position toward its second position; normally closed fluid inlet porting to said second chamber portion which is opened by said movable member when moved out of its intermediate position toward its first position; said movable member having a longitudinally extending bore between opposite ends of said member for conducting fluid flow out of said chamber portions; first and second stationary plugs in said first and second chamber portions respectively each extending into its adjacent end of said bore when said movable member is in its intermediate position; said first plug cooperating with its end of said movable member to throttle flow into said bore from said first chamber portion when said movable member is in its second position, and said second plug cooperating with its end of said movable member to throttle flow into said bore from said second chamber portion when said movable member is in its first position; each of said plugs having a longitudinally extending groove in its surface providing restricted flow communication between its cooperating end chamber portion and said longitudinally extending bore of said movable member; and spring means biasing said movable member from its first and second positions toward said intermediate position; whereby said movable member is prevented from being moved by said spring means from said first and second positions to said intermediate position by back pressure built up in said chamber portions as a result of the throttling action above described until such time as flow to said chamber portions is stopped, whereupon said spring means moves said movable member to its intermediate position preventing further flow through said valve.

10. For use with a controlled hydraulic motor, a valve for directing fluid pressure to control said hydraulic motor comprising: a valve housing, means in said valve housing defining fluid pressure inlet, outlet and two motor ports, means defining a cylindrical valve bore in said valve housing, a slide valve member reciprocably supported in said valve bore, means defining a plurality of spaced annular chambers in said valve bore which are in communication with the fluid inlet, outlet and motor ports, respectively, a plurality of annular land members on said slide valve member operable to cooperate with said annular valve bore chambers to communicate pressure fluid and exhaust fluid to or from said motor ports, slide valve actuating means connected to said slide valve member to control said fluid communication, said valve housing and slide valve member including means thereon cooperating to form opposed end chambers in said valve housing, means contained in one of said last mentioned end chambers interposed between said valve housing and slide valve member operable to urge said slide valve member toward a neutral position after actuation thereof, and means contained in the other end chamber adapted to communicate with one of said motor ports and a fluid outlet port to permit fluid pressure to be exhausted from said end chamber, said last mentioned means including a slide valve portion contained in said chamber subject to exhaust fluid pressure therein which is effective to urge said slide valve member toward an actuated position in opposition to said means tending to urge said slide valve member toward a neutral position, fluid metering means in said end chamber adjacent to and controlled by the slide valve member operatively maintaining a minimum exhaust fluid pressure in said end chamber and maintaining said slide valve member in an actuated position, and exhaust fluid pressure bleed means located in a fixed position in said chamber with respect to said slide valve member and in communication with said fluid pressure outlet port for relieving exhaust fluid pressure in said end chamber when the controlled hydraulic motor reaches the end of a stroke, and permitting said slide valve member to return to a neutral position; each of said end chambers having yieldable members interposed between said valve housing and said slidable valve member, each being operable to return said valve member to a neutral position depending upon the direction of actuation of said slide valve member, each of the end chambers containing the aforementioned fluid metering means and bleed means, and the fluid metering and bleed means in one of said chambers being operable to function as such in opposition to which ever yieldable member is tending to return the valve member toward a neutral position depending upon the direction of actuation of said valve member; said valve being further characterized in that said slide valve member includes a longitudinal cylindrical bore therein, including means therein defining a port in communication with the fluid outlet port, said fluid metering means including a fixed cylindrical plunger member in the end chambers upon which the slide valve member is operable to reciprocate, said plunger members and slide valve bore forming a variable sized orifice to maintain the minimum pressure in one of said end chambers for maintaining said slide valve member in an actuated position.

References Cited in the file of this patent

UNITED STATES PATENTS

| | | |
|---|---|---|
| 877,417 | Fields | Jan. 21, 1908 |
| 1,627,312 | Blust | May 3, 1927 |
| 2,448,532 | Kirkham | Sept. 7, 1948 |
| 2,448,557 | Stephens | Sept. 7, 1948 |
| 2,541,958 | Deardorff | Feb. 13, 1951 |
| 2,576,687 | Krehbiel | Nov. 27, 1951 |
| 2,598,891 | Cooke | June 3, 1952 |
| 2,615,428 | Deardorff | Oct. 28, 1952 |
| 2,615,433 | Deardorff | Oct. 28, 1952 |